United States Patent [19]

Takeshima

[11] 4,219,863
[45] Aug. 26, 1980

[54] DRIVE CIRCUIT FOR SOLENOID PUMP

[75] Inventor: Sadao Takeshima, Higashimatsuyama, Japan

[73] Assignee: Jidoshakiki Co., Ltd., Tokyo, Japan

[21] Appl. No.: 14,498

[22] Filed: Feb. 23, 1979

[30] Foreign Application Priority Data

Mar. 15, 1978 [JP] Japan .............................. 53-33116[U]

[51] Int. Cl.² .......................................... H01H 47/00
[52] U.S. Cl. ..................................... 361/156; 361/203
[58] Field of Search ............... 361/152, 156, 198, 203, 361/205

[56] References Cited

U.S. PATENT DOCUMENTS

| | | | |
|---|---|---|---|
| 3,310,714 | 3/1967 | Gargani | 361/152 |
| 4,138,708 | 2/1979 | Takeshima | 361/156 |
| 4,142,684 | 3/1979 | Schweitzer | 361/152 X |

Primary Examiner—Harry E. Moose, Jr.
Attorney, Agent, or Firm—Blanchard, Flynn, Thiel, Boutell & Tanis

[57] ABSTRACT

An electrical energy stored in a capacitor is discharged to the solenoid of a solenoid pump through a thyristor as the latter is controlled to conduct, thereby producing a reciprocating movement of the piston of the pump. The value of the drive current passing through the solenoid is detected by a detection circuit, and a signal which depends on the magnitude of the drive current is applied to the trigger circuit of the thyristor. The period of oscillation of the trigger circuit which controls the conduction of the thyristor is controlled by the signal, whereby a uniform drive energy per unit time to the solenoid pump is assured.

5 Claims, 9 Drawing Figures

F I G. 5
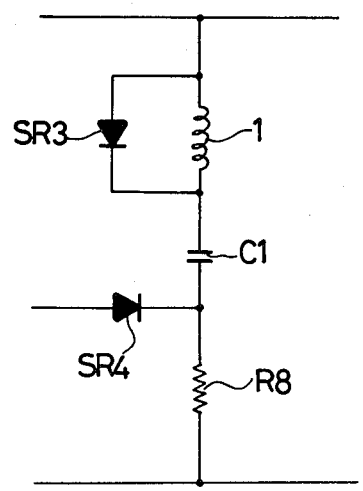

DRIVE CIRCUIT FOR SOLENOID PUMP

PRIOR ART STATEMENT

Japanese Utility Model Publication No. 41523/1974, Patent Publication No. 24726/1976, Laid-open Utility Model Application No. 33302/1975 and pending Utility Model Application No. 84541/1973, assigned to the applicant, all relate to an electromagnetic or solenoid pump which may be operated with the drive circuit of the invention. U.S. Pat. No. 3,606,595 is a counterpart of Japanese Utility Model Publication No. 41523/1974. U.S. Pat. No. 3,514,228 discloses an electromagnetic pump having a solenoid coil which is fed from a half wave rectifier connected with an a.c. source. U.S. Pat. No. 3,502,026 shows an electromagnetic pump unit including a rectifier, but which is not directed to a flow rate control. Other related art includes U.S. Pat. Nos. 4,045,714, 2,907,929, 3,562,598, 3,942,078 and 3,582,716.

BACKGROUND OF THE INVENTION

The invention relates to a drive circuit for a solenoid pump of a type controlling a small flow and in which a solenoid coil is energized intermittently to cause a reciprocatory motion of a piston to achieve a fluid supply.

Delivery and control of a fuel flow to a room heater usually takes place either through the use of a solenoid pump or through the combined use of a fluid head to deliver the fuel and a flow control valve which controls the flow rate. In the former arrangement, a pulse from an oscillator may be fed to the solenoid pump for control purpose, but a control circuit required to control the flow rate is complex. In the latter, the flow control valve of mechanical type must be equipped with an orifice of a greatly reduced size in order to permit a control over a small flow rate, presenting difficulties in its manufacture and maintenance of the required precision.

To accommodate for this situation, there is provided a drive circuit for a solenoid pump which is simple in arrangement and which permits a facilitated flow control. Such an arrangement is illustrated in FIG. 1, where an a.c. source A.C. is shown connected with one end of a series combination of a rectifier SR1 and resistor R1, the other end of which is connected with one end of a solenoid coil 1 of a solenoid pump. The other end of the coil 1 is connected with a thyristor SCR1, which is in turn connected with the other terminal of the a.c. source. A capacitor C1 is connected in shunt with the series combination of coil 1 and SCR1. The gate of thyristor SCR1 is connected with a shunt resistor R4, the other end of which is connected with the other terminal of the source. The gate is also connected with a trigger circuit which comprises a variable resistor VR1, capacitor C2 and trigger diode TD. A diode SR2 is connected through current adjusting resistors R2 and R3 with the trigger circuit, and prevents a reverse flow of the charge on the capacitor C2 to the source. A zener diode ZD1 is connected at its one end with the junction between the resistors R2, R3 and with the other terminal of the source at its other end, and functions to supply a constant voltage to the trigger circuit. A capacitor C3 may be connected in shunt with the Zener diode for maintaining the constant voltage. If desired, the resistor R1 may be formed by a variable resistor.

In operation, the alternating current from the source is rectified by rectifier SR1 into a d.c. current, which is passed through the resistor R1 to the capacitor C1. The capacitor C1 may be charged to the peak value of the a.c. source in a time interval $T_{CM}$ which is determined by the resistance of resistor R1 and the capacitance of capacitor C1. Such time interval may be several a.c. cycles. In the trigger circuit, the capacitor C2 is charged until the voltage thereacross reaches a threshold voltage of the trigger diode TD, whereupon it conducts to cause the capacitor C2 to discharge through the resistor R4, thereby developing a trigger pulse which is applied to the gate of the thyristor SCR1. This trigger pulse occurs repeatedly with a period $T_{tr}$ which depends on the breakdown voltage of the Zener diode, resistance of resistors R3, VR1, capacitance of capacitor C2 and the threshold voltage of the trigger diode TD. Thus, the period $T_{tr}$ can be varied by the adjustment of the variable resistor VR1.

In response to the trigger pulse, the thyristor SCR1 conducts, whereby the capacitor C1 discharges through the solenoid 1. When the current flows through the solenoid, the charge on the capacitor C1 is discharged and the current ceases to flow through the solenoid 1 during the negative half cycle of the source, rendering the thyristor SCR1 non-conductive. By choosing the time intervals such that $T_{CM} < T_{tr}$, the solenoid 1 can be energized by a discharge current of the capacitor C1 after it has been charged to the peak value of the source if the number of energizations per minute of the solenoid or the interval $T_{tr}$ is adjusted by means of the variable resistor VR1.

The conventional drive circuit described above is simple in arrangement and provides a desired operating characteristic while reducing the number of parts required. It is to be noted that when operated with a commercial frequency, the solenoid pump will achieve a discharge performance which is generally greater than is desired. In order to reduce the frequency, an oscillator employing a pair of thyristors is often provided which is d.c. operated by conversion from the source of a commercial frequency. As compared with such an arrangement, it will be seen that the described circuit requires a single thyristor and hence a single trigger circuit, thus simplifying the circuit arrangement and avoiding the need for the provision of a high capacity d.c. source. The flow rate can be controlled by changing the period of the trigger pulse, which is conveniently accomplished by adjusting the variable resistor VR1.

FIG. 2a shows the mechanical construction of an exemplary solenoid pump. Specifically it includes a hollow core 8 carrying a valve body 9 and disposed slidably inside the solenoid 1 so as to be excited by the latter. The pump also includes a pair of permanent magnets 4, 5 disposed in axial alignment with the core in opposing relationship with the opposite magnetic poles thereof, and a pair of springs 6, 7 disposed between the respective magnets and the valve body. A check valve 10 is included in the inlet passage of the pump. The pump is shown in longitudinal section in FIG. 2a, while FIGS. 2b and 2c show schematically the pump when the solenoid 1 is energized and deenergized, respectively. When the solenoid 1 is energized, the core 8 is magnetized to the polarity shown, and experiences an attraction by the magnet 4 and a repulsion by the magnet 5, thus moving upward as shown in FIG. 2b. When the solenoid 1 is deenergized, the core 8 tends to maintain its position shown in FIG. 2b, but the spring 6 urges it downwardly toward the magnet, until it reaches a neutral position shown in FIG. 2c where the resilience of the springs 6, 7 is balanced. When the solenoid coil 1 is energized again, the core assumes the position shown in FIG. 2b.

In the conventional drive circuit, the series connection of the solenoid coil 1 across the source AC allows an alternating current from the source to flow through the solenoid in addition to the discharge current of the capacitor C1 when the thyristor SCR1 conducts, causing a change in the energy supplied to the solenoid and hence the fluid discharge per unit time of the pump in response to fluctuations in the source voltage. Additional disadvantages relate to a varying value of the drive current applied to the solenoid 1 as the capacitance of the capacitor C1 changes with temperature fluctuation or as a result of aging effect and/or the resistance of solenoid 1 changes.

SUMMARY OF THE INVENTION

It is an object of the invention to avoid the described disadvantages of the prior art by providing a drive circuit for solenoid pump which permits an adjustment of the drive rate over an increased extent by controlling the period of oscillation of a trigger circuit through the detection of a drive current passing through the solenoid, which facilitates the circuit design and which avoids a variation in the discharge from the pump with a fluctuation of the source voltage.

In accordance with the invention, the above object is accomplished by providing detecting resistor connected in series with a solenoid drive circuit for detecting a discharge current from a capacitor which is passed through the solenoid. The voltage developed across the detecting resistor charges a second capacitor. When the voltage across the second capacitor reaches a given threshold value, the trigger circuit renders a thyristor contained in the drive circuit conductive, whereby a discharge current from the capacitor is supplied to the solenoid. As a result, if a fluctuation in the source voltage causes a corresponding change in the capacitor discharge current, the voltage developed across the second capacitor varies in a corresponding manner to change the time required for the voltage thereacross to reach the threshold value. In this manner, the period of oscillation of the trigger circuit is controlled in accordance with the magnitude of the capacitor discharge current, with consequence that the drive energy per unit time is controlled to a uniform value to maintain a uniform discharge from the pump.

BRIEF DESCRIPTION OF THE DRAWINGS

FIGS. 2b and 2c are schematic illustrations of the operation of the pump shown in FIG. 2a;

FIGS. 3 to 5 are circuit diagrams of several embodiments of the invention;

DESCRIPTION OF EMBODIMENTS

Figure 1:
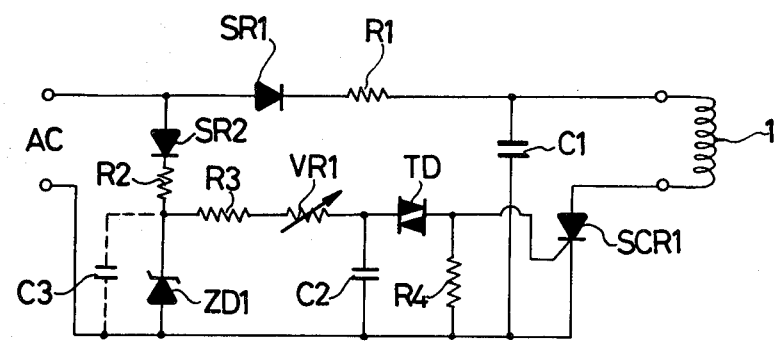
FIG. 1 is a circuit diagram of a conventional drive circuit for a solenoid pump.
Figure 2A:
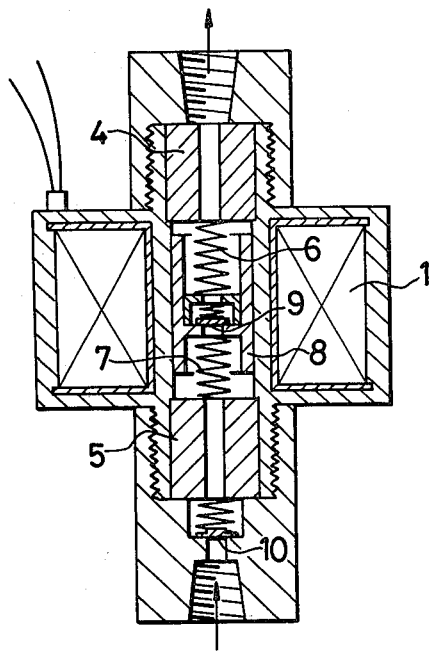
FIG. 2a is a longitudinal section of an exemplary solenoid pump.
Figure 2B:
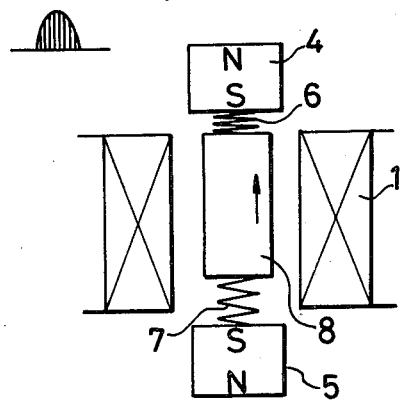
Figure 2C:
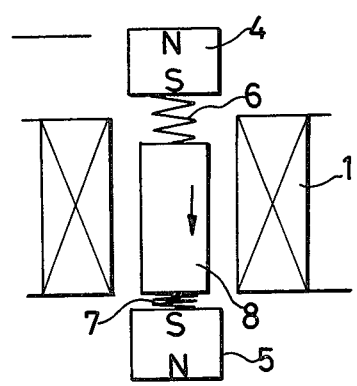
Figure 3:
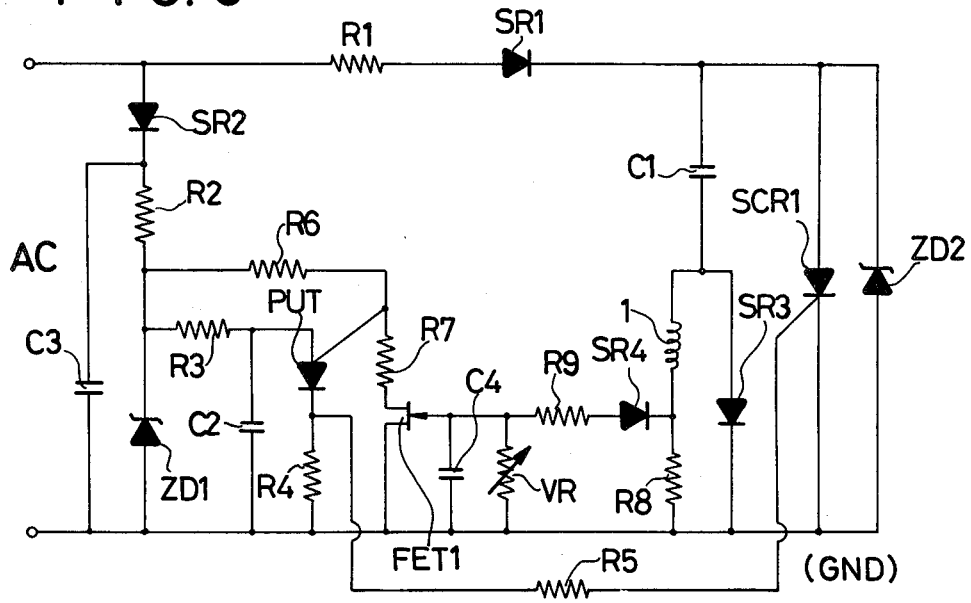

Referring to FIG. 3, there is shown a circuit diagram of one embodiment of the invention. In this Figure, elements corresponding to those shown in FIG. 1 are designated by like reference characters as before. A rectifier SR3 is connected in shunt with a series combination of the solenoid 1 and a detecting resistor R8, and represents one element in the charging circuit of capacitor C1, which is charged by a d.c. current as supplied from an a.c. supply A.C. through a series combination of resistor R1 and rectifier SR1 and supplies it to the solenoid 1 as a drive current when the thyristor SCR1 conducts. Specifically, when the thyristor SCR1 conducts, the discharge path including capacitor C1, thyristor SCR1, detecting resistor R8, and solenoid 1 is closed, whereby the capacitor C1 supplies a drive current to the solenoid 1. At this time, a voltage is developed across the detecting resistor R8 in accordance with the magnitude of the drive current. A programmable unijunction transistor PUT which may be referred to as N-gate thyristor is connected between resistors R3 and R4, and forms a main switching element of the trigger circuit. A gating circuit of PUT is formed by resistors R6, R7 and field effect transistor FET1. A detecting circuit comprises the detecting circuit R8 and a capacitor C4 which is connected between the source and gate of the field effect transistor FET1, with a series combination of a rectifier SR4 and resistor R9 being connected in series between the gate of the field effect transistor and the junction between the solenoid 1 and the detecting resistor R8, and with a variable resistor VR being connected in shunt with the capacitor C4. The arrangement is such that the detecting circuit integrates the drive current passing through the solenoid 1 with a charging time constant determined by the values of capacitor C4 and resistor R9 and a discharge time constant determined by the values of capacitor C4 and variable resistor VR, with the integrated voltage being applied to the gate of the field effect transistor FET1.

In the embodiment described above, when the power is initially turned on, the field effect transistor FET1 conducts with zero bias, and the oscillation frequency of the trigger circuit is determined by the time constant of capacitor C2 and resistor R3. After a given time interval, the potential at the anode of PUT rises above the gate potential to render PUT conductive, whereby a voltage is developed across resistor R4 to be applied to the gate of thyristor SCR1 in the discharge circuit. Consequently, a given magnitude of discharge current, which has been stored in the capacitor C1, is passed through the solenoid 1. After the discharge of the capacitor C1, thyristor SCR1 is turned off at the time when the source voltage reverses in polarity and current zero occurs. Subsequently, the capacitor C1 begins to charge. The drive current flowing through the solenoid 1 is detected by the detecting circuit, with a voltage depending on the magnitude of the drive current charging and discharging the capacitor C4 and being applied to the gate of the field effect transistor FET1, thus controlling the period of oscillation of the trigger circuit.

Describing the operation more specifically, the capacitor C1 is charged from the source through a series combination of resistor R1 and rectifier SR1. The current flow which occurs when the thyristor SCR1 conducts is detected as a voltage developed across the detecting resistor R8. This voltage is more negative than the negative terminal of the source and is integrated by a charging time constant circuit formed by capacitor C4 and resistor R9 and a discharge time constant circuit formed by capacitor C4 and variable resistor VR, with the integrated voltage being applied to the gate of the field effect transistor FET1. The latter conducts when the voltage across the capacitor C4 which is applied to its gate reaches a threshold value.

The trigger circuit includes PUT, to the anode of which is applied a constant voltage across the Zener diode ZD1 after a time delay determined by the time constant of capacitor C2 and resistor R3 both connected with this electrode. When the applied voltage is higher than the potential at the junction between the resistors R6 and R7 which forms a voltage divider for the gate of the transistor, the latter is rendered conductive, developing a voltage across the resistor R4. In response to this voltage, the thyristor SCR1 is rendered conductive.

However, it is to be noted that the gating circuit of PUT comprises the voltage divider R6, R7 and the field effect transistor FET1 connected in series therewith, so that if the field effect transistor is non-conductive, the voltage applied to the gate of the PUT is equal to the Zener voltage applied to the anode, thus precluding the conduction of PUT. In other words, PUT is rendered conductive only when the field effect transistor FET1 conducts to reduce the potential at the junction between the resistors R6, R7 below the Zener voltage applied to the anode. The conduction of the field effect transistor FET1 is controlled by the detecting circuit which supplies a threshold voltage to the gate in accordance with the magnitude of the drive current passing through the solenoid 1 and after a given time interval. For example, if the current flow through the solenoid 1 increases to increase the negative voltage level to which the capacitor C4 is charged. Since this voltage must be discharged through the variable resistor VR before the voltage to reach the threshold value of the field effect transistor FET1, an increased time delay is provided until the next occurrence of a pulse. In this manner, the period of oscillation of the trigger circuit is controlled in accordance with the magnitude of the drive current through the solenoid 1, thus achieving a uniform drive energy supplied to the solenoid pump per unit time.

Figure 4:
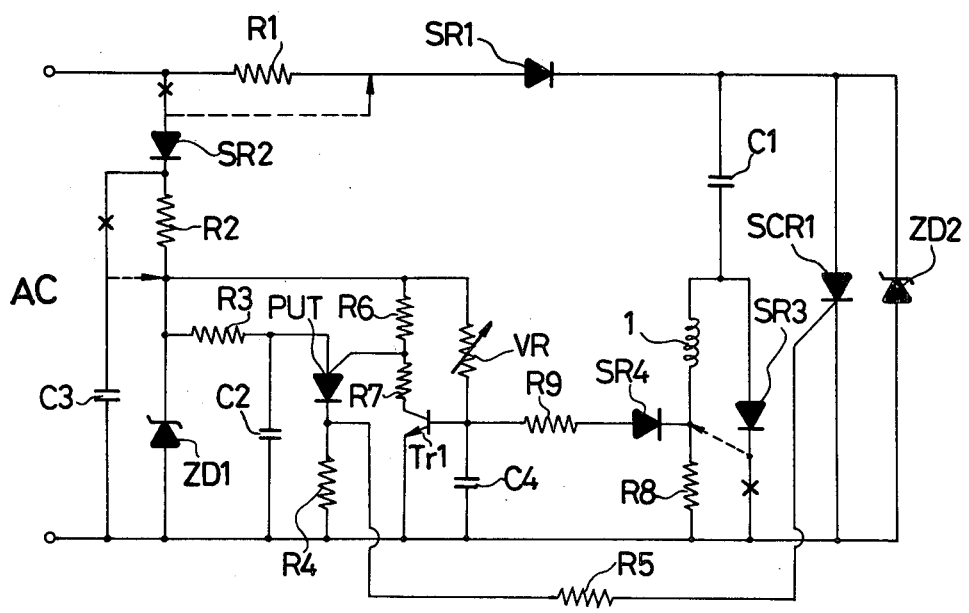

Referring to FIG. 4, there is shown another embodiment of the invention. In this instance, the field effect transistor FET1 shown in FIG. 3 is replaced by a transistor Tr1. In this embodiment, when the power is turned on, a base current is introduced through the variable resistor VR to render the transistor conductive. The oscillation frequency at the begining of the operation is determined by the time constant of capacitor C2 and resistor R3 in the same manner as mentioned above in connection with the previous embodiment. A modification is indicated by broken lines in which resistors R1 and R2 are short-circuited and the cathode of the rectifier SR3 is connected with the junction between the solenoid 1 and resistor R8.

FIG. 5 shows a possible modification in which the placement of capacitor C1 and solenoid 1 are reversed from the previous arrangements.

Figure 6A:
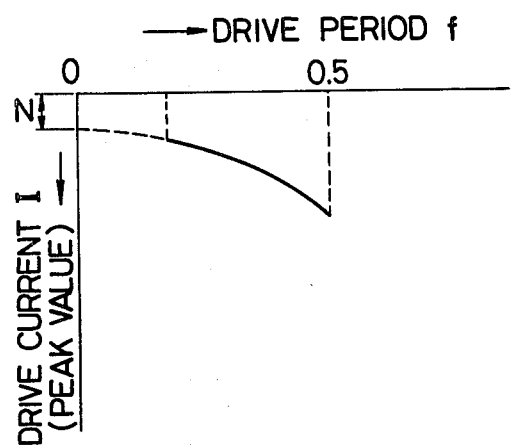
FIG. 6a graphically shows the relationship between the drive period of the pump and the solenoid drive current.
Figure 6B:
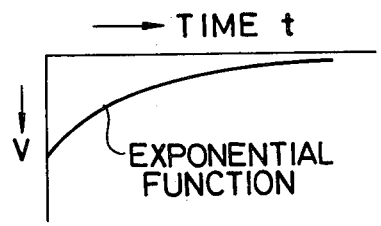
FIG. 6b graphically shows the exponential change of the voltage with time of the capacitor (C4) in FIGS. 3 and 4.

FIG. 6a graphically shows an ideal drive relationship between the drive current (I) and the drive period (f). While there is offset N which depends on the pump response, it will be seen that the curve shown in FIG. 6a is similar to a discharge characteristic of a capacitor (C4) and variable resistor (VR) circuit, which is the exponential voltage (V) time (t) response shown in FIG. 6b. Consequently, the compensation corresponds to a change in the current value, so that the circuit arrangement may operate satisfactorily without Zener diode ZD2 which is provided to control the voltage to which the capacitor C1 is charged, for selected values of pump drive period. As shown in FIG. 4, an approximately linear operation is provided with a trnasistor (Tr1) over a reduced range of current values, so that for practical purposes, the use of the transistor Tr1 achieves substantially a similar result as the embodiment shown in FIG. 3.

From the foregoing description, it will be understood that the invention controls the period of oscillation of the trigger circuit in accordance with the magnitude of a discharge current which is supplied to the solenoid of a solenoid pump, thus maintaining a stabilized discharge of the pump in the presence of a fluctuation in a source voltage, a change in the resistance of the solenoid or a change in the capacitance of the capacitor which supplies its discharge current to the solenoid.

What is claimed is:

1. A drive circuit for solenoid pump comprising a discharge circuit including a solenoid of a solenoid pump, a capacitor adapted to be charged with a d.c. current from an a.c. source through a rectifier and to discharge for supplying a drive current to the solenoid, a thyristor for controlling the conduction of a path including the capacitor and the solenoid, and a rectifier poled to conduct the charge current for the capacitor bypassing the solenoid; a detecting circuit including a detecting resistor for detecting a drive current passing through the solenoid, and a second capacitor adapted to be charged and discharged in response to the voltage developed across the detecting resistor; and a trigger circuit for rendering the thyristor conductive when the voltage across the second capacitor reaches a given threshold, thereby controlling the period of oscillation of the trigger circuit in accordance with the magnitude of the drive current through the solenoid.

2. A drive circuit according to claim 1 in which the first mentioned capacitor, solenoid and detecting resistor is connected as a series combination across the source, and the thyristor is connected in shunt with the series combination.

3. A drive circuit according to claim 1 in which the detecting resistor has its one end connected with a series combination of the first mentioned capacitor and the solenoid and its other end connected with a negative terminal of the source and providing a negative voltage in response to the drive current passing through the solenoid, and wherein the second capacitor is connected in shunt with the detecting resistor.

4. A drive circuit according to claim 1 in which the trigger circuit includes a programmable unijunction transistor having its gate connected with a series combination of a pair of resistors forming a voltage divider and a field effect transistor or a transistor, the transistor having a control electrode to which the voltage across the second capacitor is applied.

5. A drive circuit according to claim 2 in which the first mentioned capacitor and the solenoid form a series combination together with the detecting resistor, further including a Zener diode connected in shunt with the series combination, thus maintaining the drive current passing through the solenoid constant.

* * * * *